United States Patent
Chitta et al.

(10) Patent No.: US 7,983,012 B2
(45) Date of Patent: Jul. 19, 2011

(54) COMMUNICATION CIRCUIT FOR A DIGITAL ELECTRONIC DIMMING BALLAST

(75) Inventors: Venkatesh Chitta, Center Valley, PA (US); Elik Dvorkin, New Haven, CT (US); Dragan Veskovic, Allentown, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 0 days.

(21) Appl. No.: 12/815,469

(22) Filed: Jun. 15, 2010

(65) Prior Publication Data

US 2010/0246082 A1 Sep. 30, 2010

Related U.S. Application Data

(63) Continuation of application No. 11/787,934, filed on Apr. 18, 2007, now Pat. No. 7,764,479.

(51) Int. Cl.
 *H02H 3/08* (2006.01)
(52) U.S. Cl. .................................................. 361/91.6
(58) Field of Classification Search ................ 361/91.6
 See application file for complete search history.

(56) References Cited

U.S. PATENT DOCUMENTS

| 5,043,587 | A | | 8/1991 | Miki et al. |
| 5,661,347 | A | | 8/1997 | Luger et al. |
| 6,144,539 | A | * | 11/2000 | Konopka et al. ............. 361/91.2 |
| 6,727,661 | B2 | * | 4/2004 | Kominami et al. ....... 315/209 R |
| 7,433,208 | B2 | * | 10/2008 | Nishida et al. ................ 363/19 |
| 7,764,479 | B2 | | 7/2010 | Chitta et al. |
| 2007/0008671 | A1 | | 1/2007 | Picaud et al. |
| 2007/0139083 | A1 | | 6/2007 | Mirea et al. |

FOREIGN PATENT DOCUMENTS

| DE | 102005018762 A1 | 10/2006 |
| EP | 1734657 A1 | 12/2006 |

(Continued)

OTHER PUBLICATIONS

Motorola Dimming Ballast Model # M2-PD-T8-5C-B-120 Reverse-Engineered Schematic, May 23, 2000, 1 sheet.
European Patent Office, International Search Report and Written Opinion for International Patent Application No. PCT/US2008/059662, Aug. 13, 2008, 18 pages.

(Continued)

*Primary Examiner* — Jared J Fureman
*Assistant Examiner* — Ann T Hoang
(74) *Attorney, Agent, or Firm* — Mark E. Rose; Philip N. Smith

(57) ABSTRACT

A communication circuit for an electronic dimming ballast provides high-voltage miswire protection and improved rise and fall times of a transmitted digital signal. The electronic dimming ballast comprises a control circuit, which is coupled to a digital communication link, for example, a DALI communication link, via the communication circuit. The communication circuit comprises a receiving circuit for detecting when the digital ballast communication link is shorted and for providing a received digital message to the control circuit. The communication circuit also comprises a transmitting circuit for shorting the communication link in response to the control circuit. The communication circuit also includes a high-voltage fault protection circuit for protecting the circuitry of the communication circuit if the communication circuit high-voltage mains voltages. The communication circuit is operable to reliably transmit digital messages having improved rise and fall times. The communication circuit draws acceptable amounts of current when the communication link is alternatively in idle and active states.

27 Claims, 3 Drawing Sheets

FOREIGN PATENT DOCUMENTS

| | | |
|---|---|---|
| WO | WO 0041287 A1 * | 7/2000 |
| WO | WO 02/082283 A1 | 10/2002 |
| WO | WO 03/081777 A1 | 10/2003 |
| WO | WO 03/081960 A1 | 10/2003 |
| WO | WO 2005/004552 A1 | 1/2005 |
| WO | WO 2005004552 A1 * | 1/2005 |
| WO | WO 2005/072019 A1 | 8/2005 |
| WO | WO 2006/010417 A1 | 2/2006 |

OTHER PUBLICATIONS

European Patent Office, Extended European Search Report for EP09173847, Mar. 3, 2010, 8 pages R.S. Ramshaw, Power Electronic Semiconductor Switches, Jan. 1, 1993, pp. 278-280, Chapman & Hall, Great Britain, XP002568733, ISBN: 0412288702.

* cited by examiner

COMMUNICATION CIRCUIT FOR A DIGITAL ELECTRONIC DIMMING BALLAST

CROSS REFERENCE TO RELATED APPLICATIONS

This application is a continuation of commonly-assigned U.S. patent application Ser. No. 11/787,934, filed Apr. 18, 2007, entitled COMMUNICATION CIRCUIT FOR A DIGITAL ELECTRONIC DIMMING BALLAST, the entire disclosure of which is hereby incorporated by reference.

BACKGROUND OF THE INVENTION

1. Field of the Invention

The present invention relates to electronic dimming ballasts operable to be coupled to a communication link, specifically, a communication circuit for an electronic dimming ballast that provides high-voltage miswire protection and improved rise and fall times of a transmitted digital signal.

2. Description of the Related Art

Typical load control systems are operable to control the amount of power delivered to an electrical load, such as a lighting load or a motor load, from an alternating-current (AC) power source. Lighting control systems for fluorescent lamps comprise a plurality of electronic dimming ballasts that are operable to communicate via a digital communication link. The ballasts may communicate, for example, using the industry-standard Digital Addressable Lighting Interface (DALI) communication protocol. The DALI protocol allows each ballast in the lighting control system to be assigned a unique digital address, to be programmed with configuration information (e.g., preset lighting intensities), and to control the fluorescent lamp in response to commands transmitted across the communication link.

A standard DALI lighting control system includes a link power supply that generates a direct-current (DC) link voltage $V_{LINK}$, which provides power for the DALI communication link. The DALI communication link comprises two conductors (i.e., two wires) and is coupled to each of the ballasts, such that each ballast receives the DC link voltage $V_{LINK}$ of the link power supply. The ballasts are also coupled to the AC power source to receive line voltage (e.g., 120 or 277 $V_{AC}$) for powering the fluorescent lamps. To simplify installation, the two conductors of the DALI communication link are often installed in the same channel or conduit as the high-voltage AC wiring (i.e., line voltage). Thus, the conductors of the DALI communication link are often classified as "high-voltage" conductors.

Each DALI ballast includes a microprocessor for handling the communications with the other DALI ballasts and controlling the operation of the circuitry that controls the intensity of the connected lamp. A communication circuit in each of the DALI ballasts couples the microprocessor to the DALI communication link. The communication circuit preferably comprises at least two optocouplers for providing the received digital messages to the microprocessor and for providing the digital messages to be transmitted on the DALI communication link. The optocouplers provide isolation between the conductors of the DALI communication link and the microprocessor.

According to the DALI protocol, the DALI ballasts encode the digital messages that are transmitted over the communication link using Manchester encoding. With Manchester encoding, the bits of the digital messages (i.e., either a logic zero value or a logic one value) are encoded in the transitions (i.e., the edges) of the signal on the communication link. When no messages are being transmitted on the communication link, the link floats high in an idle state. To transmit a logic one value, the communication circuit of each DALI ballast is operable to "short" the communication link (i.e., electrically connect the two conductors of the link) to cause the communication link to change from the idle state (i.e., 18 $V_{DC}$) to a shorted state (i.e., a "high-to-low" transition). Conversely, to transmit a logic zero value, the communication circuit is operable to cause the communication link to transition from the shorted state to the idle state (i.e., a "low-to-high" transition).

An example of a digital electronic dimming ballast operable to be coupled to a communication link and a plurality of other input sources is described in greater detail in co-pending commonly-assigned U.S. patent application Ser. No. 10/824,248, filed Apr. 14, 2004, entitled MULTIPLE-INPUT ELECTRONIC BALLAST WITH PROCESSOR, and U.S. patent application Ser. No. 11/011,933, filed Dec. 14, 2004, entitled DISTRIBUTED INTELLIGENCE BALLAST SYSTEM AND EXTENDED LIGHTING CONTROL PROTOCOL. The entire disclosures of both applications are hereby incorporated by reference.

The DALI protocol is standardized by the in accordance with a technical standard published by the International Electrotechnical Commission (IEC), specifically, the IEC standard 60929A, which defines many required operating characteristics of the communication circuit of a DALI ballast. The technical standard imposes limitations on the current draw of the DALI ballast. For example, when the communication link is idle (i.e., 18 $V_{DC}$), the communication circuit must not draw more than 2 mA. When the communication circuit is transmitting (i.e., shorting the link), the DALI ballast must draw at least 250 mA and must provide no more than 4 V between the conductors of the communication link. The IEC standard also defines the rise and fall times of the edges of the data signal to be between 10 μs and 100 μs.

The use of optocouplers to transmit digital messages on the DALI communication link often causes the digital messages transmitted by the DALI ballasts to be susceptible to long rise and fall times. While some characteristics, such as the current transfer ratio (CTR), of the optocoupler are guaranteed by an optocoupler manufacturer, the rise and fall times are typically specified only under specific operating conditions. Therefore, the rise and fall times of the optocoupler cannot be guaranteed, for example, when the optocouplers are used to drive the DALI communication link, unless the same operating conditions exist. To decrease the length of the rise and fall times of the data signal in order to meet the IEC standard, it is often necessary to drive the optocouplers with larger currents. However, these drive currents cannot exceed the maximum idle current limit (i.e., 2 mA) when the link is idle.

Since the two conductors of the DALI communication link are often run along side the high-voltage wiring for the ballasts, it is possible that the two conductors of the DALI communication link may be miswired to the high-voltage wiring. The communication circuits of many prior art DALI ballasts have not been protected against high-voltage (i.e., line voltage) miswires. Some prior art ballast have simply included all high-voltage rated components in the communication circuits. However, if such a communication circuit shorts the communication link during a high-voltage miswire, the communication circuit is susceptible to damage due to high currents that are generated.

Thus, there is a need for a DALI communication circuit that is able to reliably transmit digital messages having rise and fall times that are within the range defined by the IEC standard, while also meeting the current draw limitations of the IEC standard. Further, there is a need for a DALI communication circuit that is capable of being miswired to high-voltage mains voltages, such as 120 or 277 $V_{AC}$, without having components damaged under any circumstances.

SUMMARY OF THE INVENTION

According to the present invention, a communication circuit for a load control device comprises a receiving circuit, a transmitting circuit, and a fault protection circuit. The load control device is operable to be coupled to a communication link having two conductors. The load control device is operable to transmit a digital message by changing the communication link between an idle state in which a first voltage is developed across the conductors on the communication link and an active state in which the conductors of the communication link are at substantially the same electrical potential. The receiving circuit is coupled between the conductors of the communication link and the transmitting circuit is coupled between the conductors of the communication link. The transmitting circuit comprises a controllably conductive device for electrically coupling the conductors of the communication link together, and a current limit circuit for limiting the magnitude of a current through the controllably conductive device. The fault protection circuit is operatively coupled between the conductors of the communication link and is operable to protect the receiving and transmitting circuits. The fault protection circuit comprises a controllably conductive device coupled between the receiving and transmitting circuits and a second one of conductors of the communication link. The fault protection circuit further comprises a turn-on circuit coupled between the first terminal and the control input of the controllably conductive device. The turn-on circuit includes a resistor, a capacitor coupled to the control input of the controllably conductive device for developing a drive voltage, and a zener diode coupled in parallel electrical connection with the capacitor to limit the magnitude of the drive voltage. The turn-on circuit is operable to provide the drive voltage to the control input of the controllably conductive device, such that the controllably conductive device is rendered conductive when the first voltage is provided across the conductors of the communication link and is rendered non-conductive when a second voltage is provided across the first and second terminals. The first voltage has a magnitude less than a predetermined threshold, while the second voltage has a magnitude greater than the predetermined threshold. If the controllably conductive device of the transmitting circuit is electrically coupling the conductors of the communication link together and the second voltage is provided across the first and second terminals, the current limit circuit limits the magnitude of the current through the controllably conductive device of the transmitting circuit and the fault protection circuit subsequently disconnects the transmitting circuit from the second one of the conductors of the communication link.

According to another embodiment of the present invention, a communication circuit for a load control device comprises a receiving circuit and a transmitting circuit. The load control device is operable to be coupled to a communication link having two conductors and is operable to transmit a digital message by alternating the communication link between an idle state in which a link voltage is developed across the conductors on the communication link and an active state in which the conductors of the communication link are at substantially the same electrical potential. The receiving circuit is coupled between the conductors of the communication link and is operable to conduct an idle current when the communication link is in the idle state. The transmitting circuit is coupled between the conductors of the communication link and comprises an optocoupler, a voltage clamp, a controllably conductive device, and a current source. The optocoupler has an input and an output, which comprises a phototransistor and is operable to become conductive when the input is driven with an input current. The output of the optocoupler is operable to conduct the idle current immediately after becoming conductive. The voltage clamp is coupled across the output of the optocoupler and is operable to clamp the voltage across the output of the optocoupler in the idle state. The controllably conductive device is responsive to the output of the optocoupler to electrically couple the conductors of the communication link together when the output of the optocoupler is conductive and to stop electrically connecting the conductors of the communication link when the output is non-conductive. The current source is coupled to the phototransistor of the optocoupler and is operable to generate a source current when the controllably conductive device is electrically coupling the conductors of the communication link together. When the communication link is in the idle state, the current source does not generate the source current. When the controllably conductive device is electrically coupling the conductors of the communication link together, the output of the optocoupler is operable to conduct a first portion of the source current and the voltage clamp is operable to conduct a second portion of the source current, such that the phototransistor of the optocoupler is maintained in an active region of operation.

The present invention further provides a high-voltage fault protection circuit for protecting a communication circuit of a load control device. The load control device is coupled to a digital communication link via first and second terminals. The communication circuit is adapted to electrically couple the first and second terminals together. The fault protection circuit is operatively coupled to the first and second terminals of the load control device. The fault protection circuit comprises a controllably conductive device having two main load terminals and a control input. The main load terminals of the controllably conductive device are coupled in series electrical connection between the communication circuit and the second terminal of the load control device. The controllably conductive device is rendered conductive when a first voltage having a magnitude less than a predetermined threshold is provided across the first and second terminals. The controllably conductive device is operable to become non-conductive and to disconnect the communication circuit and the second terminal when a second voltage having a magnitude greater than the predetermined threshold is provided across the first and second terminals. The fault protection circuit further comprises a turn-on circuit coupled between the first terminal and the control input of the controllably conductive device. The turn-on circuit comprises a resistor, a capacitor, and a zener diode, and is operable to provide a drive voltage to the control input of the controllably conductive device when the first voltage is provided across the first and second terminals. The capacitor is coupled to the control input of the controllably conductive device such that the drive voltage develops across the capacitor, while the zener diode is coupled in parallel electrical connection with the capacitor to limit the magnitude of the drive voltage. The fault protection circuit further comprises a current limit circuit for limiting the magnitude of a current conducted through the communication circuit. If the communication circuit is electrically coupling the conductors of the communication link together and the second voltage is provided across the first and second terminals, the current limit circuit limits the magnitude of the current through the communication circuit and the fault protection circuit subsequently disconnects the communication circuit from the second one of the conductors of the communication link.

In addition, the present invention provides, a method of transmitting a digital message from a communication circuit via a communication link having two conductors. The method comprises the steps of: (1) drawing an idle current when the communication link is in an idle state; (2) providing an optocoupler having an input and an output comprising a phototransistor; (3) limiting the voltage produced across the output of the optocoupler; (4) driving the input of the optocoupler, such that the output of the optocoupler is operable to conduct a drive current; (5) electrically connecting the two conductors of the communication link to change the communication link from an idle state to a shorted state in response to in response to the step of driving the input of the optocoupler; (6) providing a source current to the phototransistor to maintain the phototransistor in the active region of operation only when the phototransistor is conducting the drive current; (7) ceasing driving the input of the optocoupler, such that the output of the optocoupler ceases to conduct the drive current; and (8) ceasing providing the source current to the phototransistor after the step of ceasing driving the input of the optocoupler.

According to another aspect of the present invention, a method of protecting a communication circuit of a load control device coupled to a digital communication link via first and second terminals comprises the steps of: (1) providing a controllably conductive device operatively coupled between the communication circuit and the second terminal, the controllably conductive device having a control input operatively coupled to the first terminal through a turn-on circuit, the turn-on circuit including a resistor, a capacitor coupled to the control input of the controllably conductive device for developing a drive voltage, and a zener diode coupled in parallel electrical connection with the capacitor; (2) the turn-on circuit providing the drive voltage to the control input of the controllably conductive device when a first voltage is provided across the first and second terminals; (3) the zener diode limiting the magnitude of the drive voltage; (4) limiting a current conducted through the communication circuit; (5) subsequently determining if a voltage developed between the first and second terminals exceeds a predetermined threshold; and (6) causing the controllably conductive device to become non-conductive to disconnect the communication circuit from the second terminal in response to the step of determining that the voltage developed between the two terminals exceeds the predetermined threshold.

Other features and advantages of the present invention will become apparent from the following description of the invention that refers to the accompanying drawings.

DETAILED DESCRIPTION OF THE INVENTION

Figure 1:
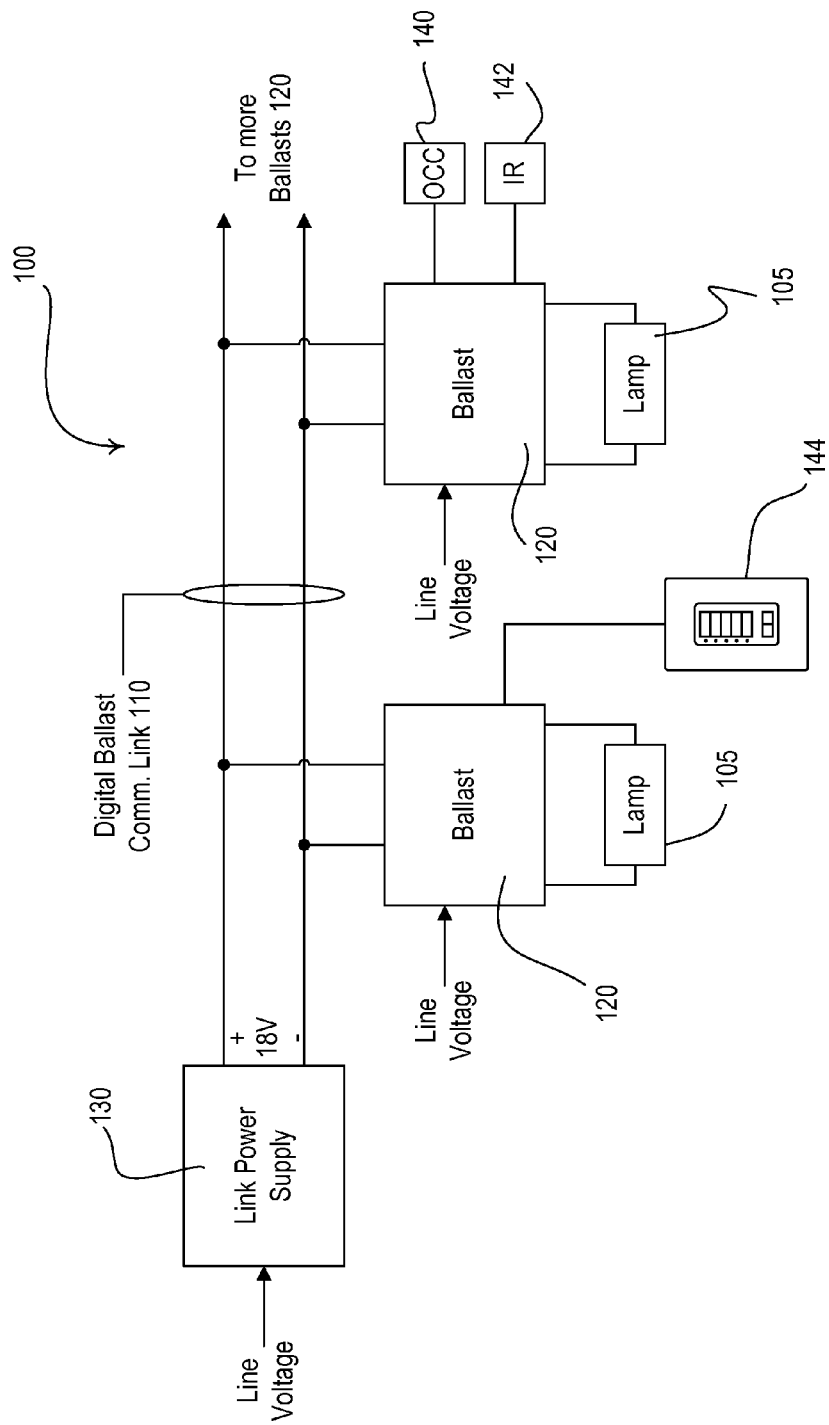
FIG. 1 is a simplified block diagram of a lighting control system for control of the intensity of a plurality of fluorescent lamps according to the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of a fluorescent lighting control system 100 for control of the intensity of a plurality of fluorescent lamps 105 according to the present invention. The fluorescent lighting control system 100 includes a digital ballast communication link 110 (e.g., a DALI communication link). The digital communication link 110 is coupled to two digital electronic dimming ballasts 120 (e.g., DALI ballasts) and a link power supply 130. The ballasts 120 are each coupled to an alternating-current (AC) mains line voltage and control the amount of power delivered to the lamps 105 to thus control the intensities of the lamps. Each ballast 120 is operable to receive a plurality of inputs from, for example, an occupancy sensor 140, an infrared (IR) receiver 142, and a keypad 144, and to subsequently control the intensities of the lamps 105 in response. The DALI power supply 130 may be coupled to more ballasts 120, for example, up to 64 ballasts.

The ballasts 120 and the link power supply 130 of the fluorescent lighting control system 100 preferably operate in accordance with the DALI standard. The link power supply 130 receives line voltage and generates the DC link voltage $W_{LINK}$ (i.e., 18 $V_{DC}$) for the digital ballast communication link 110. The ballasts 120 use Manchester encoding to communicate with the other ballasts on the communication link 110. To transmit a logic zero value, the ballasts 120 short the conductors (i.e., electrically connects) of the communication link 110 to cause the communication link to transition from the idle state to the shorted state (i.e., an active state). To transmit a logic zero value, the ballasts 120 cause the communication link 110 to transition from the shorted state to the idle state. Therefore, the ballasts 120 are operable to transmit digital messages by alternating the digital ballast communication link 110 between the shorted state and the idle state.

Figure 2:
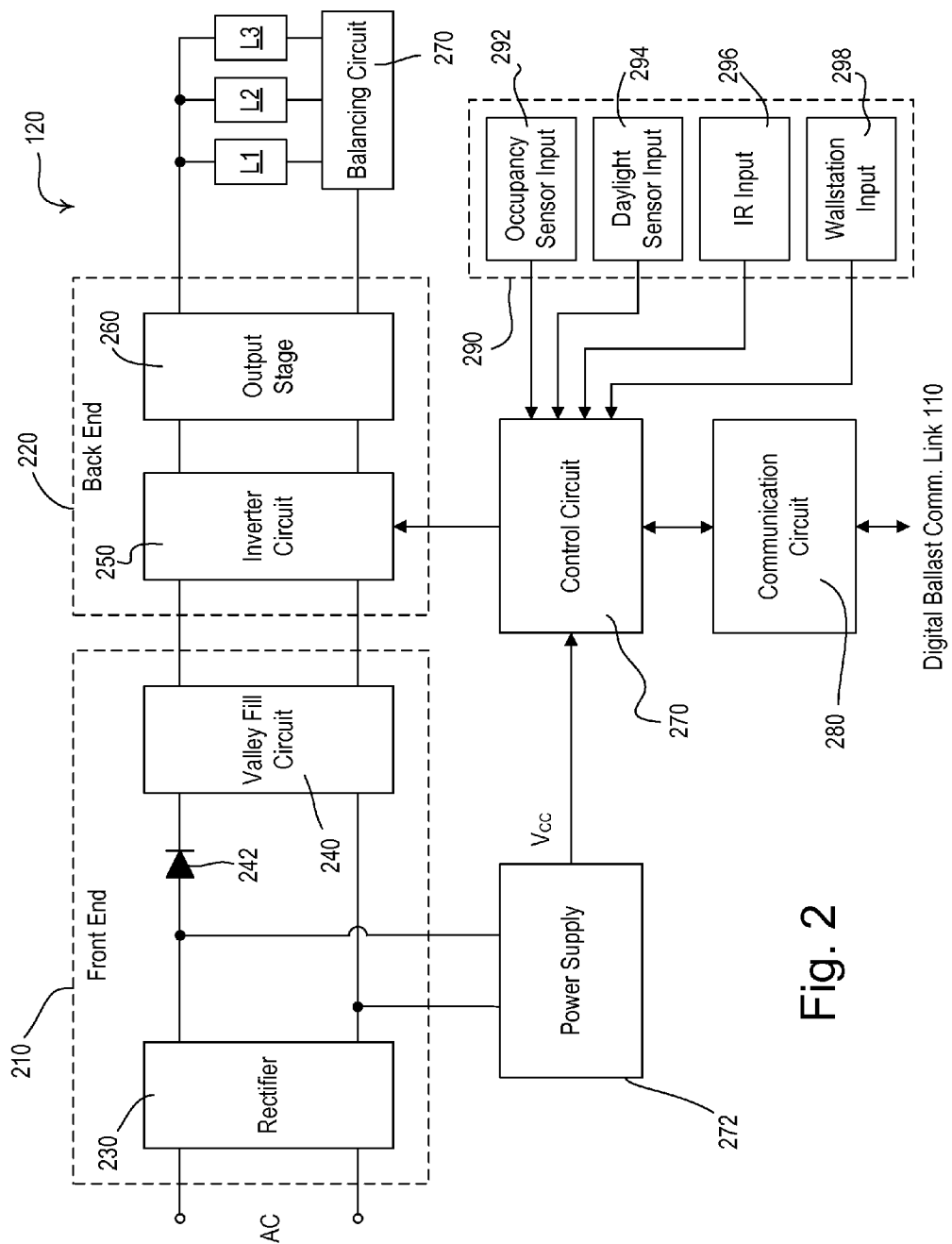
FIG. 2 is a simplified block diagram of a digital electronic dimming ballast of the lighting control system of FIG. 1 according to the present invention.

FIG. 2 is a simplified block diagram of the digital electronic dimming ballast 120 according to the present invention. As shown in FIG. 2, the ballast 120 is driving three fluorescent lamps L1, L2, L3 in parallel. Electronic ballasts typically can be analyzed as comprising a front end 210 and a back end 220. The front end 210 typically includes a rectifier 230 for generating a rectified voltage from the AC mains line voltage, and a filter circuit, for example, a valley-fill circuit 240, for filtering the rectified voltage to produce a direct-current (DC) bus voltage. The valley-fill circuit 240 is coupled to the rectifier 230 through a diode 242 and includes one or more energy storage devices (e.g., capacitors) that selectively charge and discharge so as to fill the valleys between successive rectified voltage peaks to produce a substantially DC bus voltage. The DC bus voltage is the greater of either the rectified voltage or the voltage across the energy storage devices in the valley-fill circuit 240.

The back end 220 typically includes an inverter 250 for converting the DC bus voltage to a high-frequency AC voltage and an output circuit 260 comprising a resonant tank circuit for coupling the high-frequency AC voltage to the lamp electrodes. A balancing circuit 265 is provided in series with the three lamps L1, L2, L3 to balance the currents through the lamps and to prevent any lamp from shining brighter or dimmer than the other lamps. The front end 210 and back end 220 of the ballast 120 are described in greater detail in commonly-assigned U.S. Pat. No. 6,674,248, issued Jan. 6, 2004, entitled ELECTRONIC BALLAST, the entire disclosure of which is hereby incorporated by reference.

A control circuit 270 generates drive signals to control the operation of the inverter 250 so as to provide a desired load current to the lamps L1, L2, L3. The control circuit 270 preferably comprises a microprocessor, but may comprise any suitable type of controller, such as, for example, a programmable logic device (PLD), a microprocessor, or an application specific integrated circuit (ASIC). A power supply 272 is connected across the outputs of the rectifier 230 to provide a DC supply voltage, $V_{CC}$, which is used to power the control circuit 270. A communication circuit 280 is coupled to the control circuit 270 and allows the control circuit 270 to communicate with the other ballasts 120 on the digital ballast communication link 110. The ballast 120 further comprises a plurality of inputs 290 having an occupancy sensor input 292, a daylight sensor 294, an IR input 296, and a wallstation 298 input. The control circuit 270 is coupled to the plurality of inputs 290 such that the control circuit 270 is responsive to the occupancy sensor 140, a daylight sensor (not shown), the IR receiver 142, and the keypad 144 of the DALI lighting control system 100.

Figure 3:
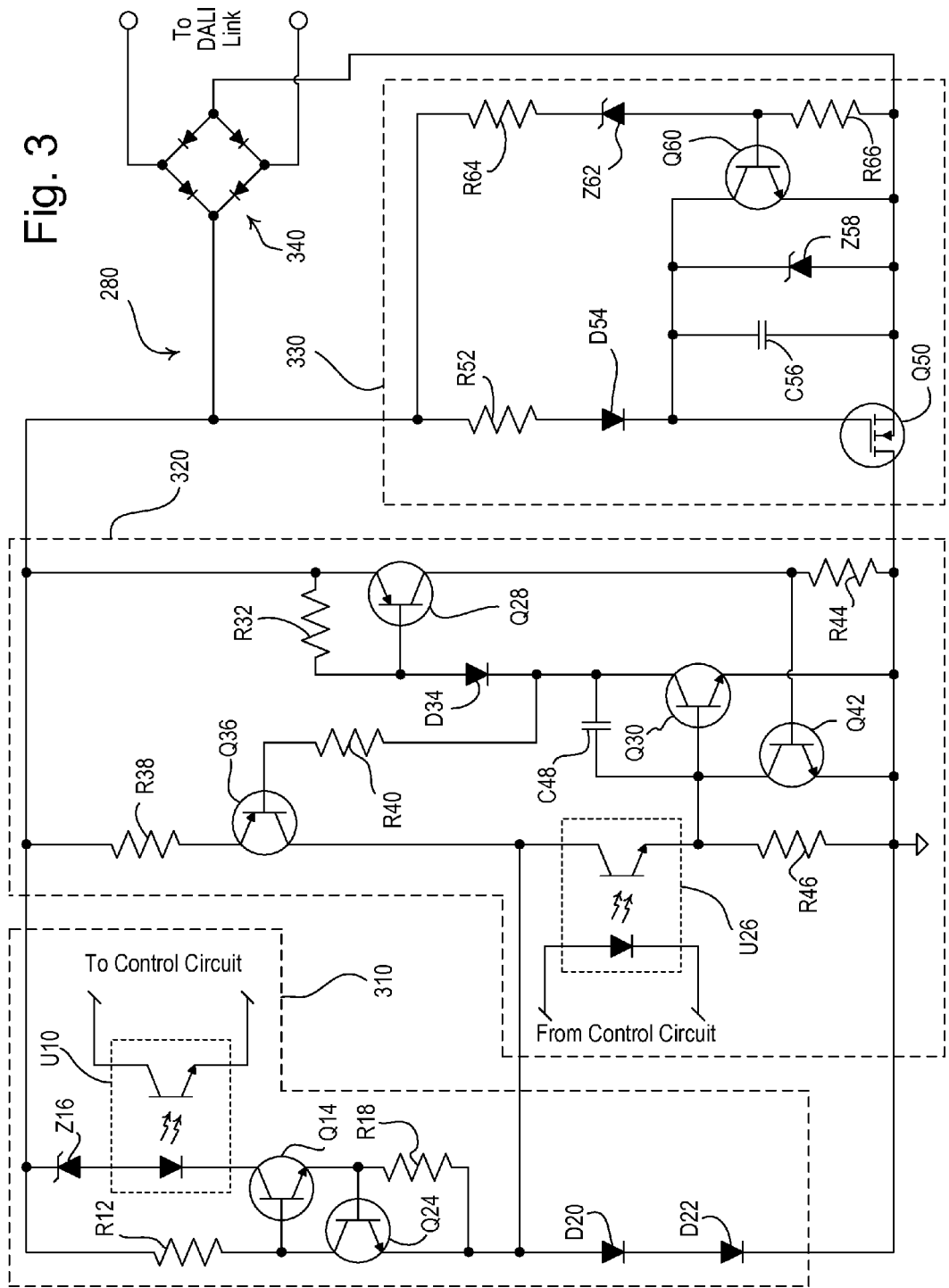
FIG. 3 is a simplified schematic diagram of a communication circuit of the dimming ballast of FIG. 2 according to the present invention.

FIG. 3 is a simplified schematic diagram of the communication circuit 280 according to the present invention. The communication circuit 280 comprises a receiving circuit 310 for detecting when the digital ballast communication link 110 is shorted and for providing a received digital message to the control circuit 270. The communication circuit 280 also comprises a transmitting circuit 320 for shorting the two conductors of the communication link 110 in response to the control circuit 270. Finally, the communication circuit 280 includes a high-voltage fault protection circuit 330, which is coupled to the communication link 110 through a full-wave bridge rectifier 340 and terminals E1, E2.

The receiving circuit 310 comprises an optocoupler U10 for providing the received digital messages to the control circuit 270. When the digital ballast communication link 110 is idle (i.e., floating high at 18 $V_{DC}$), a current flows through a resistor R12 (which preferably has a resistance of 100 kΩ) and into the base of an NPN bipolar junction transistor (BJT) Q14. A zener diode Z16 is coupled in series with the photodiode (i.e., the input) of the optocoupler U10 and the collector-emitter junction of the transistor Q14. The zener diode Z16 has a break-over voltage of 3.6 V, such that when the voltage across the communication link 110 is greater than approximately 6 V (i.e., the link is idle), the receiving circuit 130 conducts an idle current $I_{IDLE}$ through the zener diode Z16, the photodiode of the optocoupler U10, the transistor Q14, a resistor R18, and two diodes D20, D22 of the transmitting circuit 320. When the photodiode of the optocoupler U10 conducts, the phototransistor (i.e., the output of the optocoupler) also conducts, thus, providing the control circuit 270 with an indication that the communication link 110 is idle.

When a voltage produced across the resistor R18 exceeds the required base-emitter voltage of an NPN bipolar junction transistor Q24, the transistor Q24 begins to conduct. Since the resistor R18 preferably has a resistance of 511Ω and the base-emitter voltage of the transistor Q24 is approximately 0.6 V, the idle current $I_{IDLE}$ through the receiving circuit 310 is limited to approximately 1.2 mA. Since the magnitude of the idle current $I_{IDLE}$ of the receiving circuit 310 is less than 2 mA, the ballast 120 meets the IEC standard (i.e., the DALI standard) of maximum current draw when the digital ballast communication link 110 is idle.

When one of the ballasts 120 shorts the conductors of the digital ballast communication link 110, the voltage across DC output terminals of the bridge rectifier 305 drop to approximately 3 V. Since the voltage across the receiving circuit 310 is now less than the break-over voltage of the zener diode Z16 (i.e., 3.6 V), the zener diode Z16 stops conducting current through the photodiode of the optocoupler U10. Accordingly, by becoming non-conductive, the phototransistor of the optocoupler U10 provides the control circuit 270 with an indication that the communication link 110 has been shorted.

The transmitting circuit 320 comprises an optocoupler U26, which receives from the control circuit 270 the digital messages to transmit on the digital ballast communication link 110. The optocoupler U26 is preferably part number HMHA2801C manufactured by Fairchild Semiconductor Corporation. The current transfer ratio (CTR) of the optocoupler U26 is preferably 100%, but may range from 50% to 100%. The transmitting circuit 320 is operable to "short" the communication link 110 using a PNP bipolar junction transistor Q28 in response to the control circuit 270 driving the photodiode (i.e., the input) of the optocoupler U26. The PNP bipolar junction transistor Q28 may alternatively comprise any suitable type of controllably conductive device, such as, a triac, a field-effect transistor (FET), an insulated gate bipolar transistor (IGBT), or other type of semiconductor switch. When the control circuit 270 is not driving the photodiode of the optocoupler U26, the phototransistor (i.e., the output) is also not conductive and the transistor Q28 is not controlled to short the communication link 110.

When the digital ballast communication link 110 is idle, the diodes D20, D22 conduct the idle current $I_{IDLE}$ of the receiving circuit 310 and a voltage substantially equal to two diode drops is produced across the collector-emitter junction of the phototransistor. A "diode drop" is herein defined as the forward voltage produced from the anode to the cathode of a typical diode when the diode is conductive, for example, approximately 0.6 V at room temperature. The diodes D20, D22 operate as a voltage clamp to limit the voltage produced across the phototransistor of the optocoupler U26 to approximately 1.2 V when the communication link 110 is idle. Alternatively, a zener diode could replace the two series-connected diodes D20, D22.

When the control circuit 270 drives the photodiode of the optocoupler U26 with an input current $I_{IN}$, the phototransistor begins to conduct an output current $I_{OUT}$ through the receiving circuit 310 and into the base of an NPN bipolar junction transistor Q30. Subsequently, the transistor Q30 conducts a current through a diode D32 and a resistor R34, causing the transistor Q28 to become conductive and short the communication link 110. The resistor R34 preferably has a resistance of 1 kΩ.

The control circuit 270 drives the photodiode of the optocoupler U26 with the input current $I_{IN}$ having a magnitude, for example, of 2 mA. Since the optocoupler U26 has a CTR of 50 to 100%, the output current $I_{OUT}$ through the phototransistor is operable to have a magnitude of up to 2 mA. When the phototransistor of the optocoupler U26 initially begins to conduct, the phototransistor draws current through the receiving circuit 310. Accordingly, the magnitude of the output current $I_{OUT}$ is initially substantially equal to the magnitude of the idle current $I_{IDLE}$ and substantially no current flows through the diodes D20, D22.

Since the base-emitter voltage of the transistor Q30 is approximately 0.6 V and the two diodes D20, D22 are coupled from the collector of the phototransistor of the optocoupler U26 to circuit common, the voltage across the collector-emitter junction of the phototransistor is approximately 0.6 V (i.e., a diode drop) when the communication link 110 is shorted. The voltage across the output of the optocoupler U26 therefore only swings from the approximately 1.2 V when the communication link 110 is idle to 0.6 V when the transmitting circuit 320 is shorting the link. The small voltage swing across the collector-emitter junction of the phototransistor of the optocoupler U26 (i.e., only approximately 0.6 V) helps to improve the timing parameters of the communication circuit 280, e.g., to reduce the rise and fall times of the edges of the transmitted digital messages.

A PNP bipolar junction transistor Q36 is coupled to the collector of the phototransistor of the optocoupler U26 and is maintained non-conductive when the communication link 110 is idle. While the transistor Q28 is shorting the communication link 110, the transistor Q36 and two resistors R38, R40 operate as a current source to provide excess current for the phototransistor of the optocoupler U26. Specifically, when the transistor Q36 is conductive, the voltage across the resistor R38, the emitter-base junction of the transistor Q36, and the resistor R40 is approximately equal to two diode drops, i.e., the voltage across the emitter-base junction of the transistor Q28 and the diode D34. Preferably, the gain of the transistor Q36 is approximately 150 and the resistors R38 and R40 have resistances of 33Ω and 12 kΩ, respectively, such that a source current $I_{SOURCE}$ through the resistor R38 and the emitter-collector junction of the transistor Q36 has a magnitude of approximately 5 mA.

Accordingly, the source current $I_{SOURCE}$ of approximately 5 mA is provided to the collector of the phototransistor of the optocoupler U26. Since the optocoupler U26 preferably has a CTR of 100% and the photodiode of the optocoupler is driven with 2 mA, the output current $I_{OUT}$ through the phototransistor has a magnitude of approximately 2 mA after the transistor Q36 begins to conduct. The phototransistor of the optocoupler U26 is operated in the active region and is prevented from saturating when the transmitting circuit 320 is shorting the communication link 110. The excess current (i.e., the difference between the source current $I_{SOURCE}$ and the output current $I_{OUT}$) is approximately 3 mA and is conducted through the two diodes D20, D22. In summary, a first portion (i.e., approximately 2 mA) of the source current $I_{SOURCE}$ is conducted through the phototransistor of the optocoupler U26, while a second portion (i.e., approximately 3 mA) of the source current $I_{SOURCE}$ is conducted through the two diodes D20, D22.

The current through the transistor Q28 is limited by a current limit circuit having an NPN bipolar junction transistor Q42 and a resistor R44. If the current through the transistor Q28 and thus the resistor R44 is too high, the voltage across the resistor R44 exceeds the appropriate base-emitter voltage of the transistor Q42, which pulls the base of the transistor Q30 to circuit common. Accordingly, the transistors Q30 and Q28 become non-conductive. The resistor R44 preferably has a resistance of 2Ω, such that the current through the transistor Q28 is limited to approximately 300 mA.

When the control circuit 270 stops driving the photodiode of the optocoupler U26, the transistor Q28 stops shorting the communication link 110. A resistor R46 and a capacitor C48 are coupled to the emitter of the phototransistor of the optocoupler U26 and the base of the transistor Q30 and determine the rise time of the rising edge of the transmitted digital message. Since the phototransistor of the optocoupler U26 is maintained in the active region, the phototransistor is operable to become non-conductive quicker than if the phototransistor had saturated. The excess source current $I_{SOURCE}$ aides in minimizing the rise time of the rising edges of the transmitted digital messages. Preferably, the resistor R46 has a resistance of 2 kΩ and the capacitor C48 has a capacitance of 220 pF, such that the rise time is approximately 15-20 μsec.

The high-voltage fault protection circuit 330 protects the receiving circuit 310 and the transmitting circuit 320 in the event of a high-voltage miswire at the conductors of the digital ballast communication link 110 via terminals E1, E2. The fault protection circuit 330 contains a series-connected controllably conductive device, e.g., a high-voltage field-effect transistor (FET) Q50. The FET Q50 has two main load terminals, which are coupled in series between the circuit common of the transmitting circuit 320 and the negative DC terminal of the bridge rectifier 340. The FET Q50 is preferably part number FQD6N50 manufactured by Fairchild Semiconductor Corporation (which is rated for a maximum voltage of 500 V), but may comprise any suitable type of controllably conductive device, such as relay or a semiconductor switch. The FET Q50 is conductive when the correct link voltage (i.e., approximately 18 $V_{DC}$) is present across the communication link 110. The FET Q50 is operable to become non-conductive and disconnect the receiving circuit 310 and the transmitting circuit 320 from the communication link 110 when the voltage across the conductors of the communication link exceeds a predetermined miswire threshold voltage $V_{MISWIRE}$, e.g., 30 V.

The fault protection circuit 330 comprises a turn-on circuit including a resistor R52, a diode D54, a capacitor C56, and a zener diode Z58. When the voltage across the communication link 110 is at the correct link voltage, a current flows through the resistor R52 and the diode D54 to charge the capacitor C56 and generate a drive voltage $V_{DRIVE}$. The drive voltage $V_{DRIVE}$ developed across the capacitor C56 is limited by the zener diode Z58, which preferably has a break-over voltage of 10V. The drive voltage $V_{DRIVE}$ across the capacitor C56 is provided to the gate of the FET Q50, causing the FET Q50 to be rendered conductive when the communication link 110 is at correct link voltage (i.e., approximately 18 $V_{DC}$). The capacitor C56 maintains the FET Q50 conductive while the communication link 110 is being shorted. Preferably, the resistor R52 has a resistance of 300 kΩ and the capacitor C56 has a capacitance of 220 nF.

The fault protection circuit 330 also comprises a turn-off circuit including an NPN bipolar junction transistor Q60, a zener diode Z62, and two resistors R64, R66 (which preferably have resistances of 450 kΩ and 100 kΩ, respectively). The transistor Q60 is coupled across the capacitor C56 and is non-conductive when the link voltage is at the correct value of 18 $V_{DC}$. However, when the voltage across the communication link 110 exceeds a predetermined miswire threshold, i.e., the break-over voltage of the zener diode Z62 (e.g., preferably 24 V), the zener diode Z62 begins to conduct a current through the resistors R64, R66. When a voltage produced across the resistor R66 exceeds the appropriate base-emitter voltage of the transistor Q60, the transistor Q60 begins to conduct, thus shorting the capacitor C56 and causing the FET Q50 to be rendered non-conductive.

The turn-off circuit is operable to render the transistor Q60 conductive before the turn-on circuit renders the FET Q50 conductive thereby protecting the receiving circuit 310 and the transmitting circuit 320 in the event of a high voltage miswire. The resistor R52 and the capacitor C56 of the turn-on circuit determine a time delay from when a voltage is applied to the terminals E1, E2 of the communication circuit 280 to when the FET Q50 is rendered conductive. When a voltage above the predetermined threshold is applied to the terminals E1, E2, the zener diode Z62 of the turn-off circuit causes the transistor Q60 to become conductive before the capacitor C56 charges to the appropriate voltage to turn on the FET Q50.

If the transmitting circuit 320 is shorting the communication link 110, i.e., the transistor Q28 is conductive when a high voltage miswire is applied to the terminals E1, E2 of the communication circuit 280, the current limit circuit of the transmitting circuit 320 protects the transistor Q28. Specifically, in the event of a high voltage miswire while the transistor Q28 is conducting, the transistor Q42 limits the current through the resistor R44 to approximately 300 milliamps. Accordingly, the voltage across the collector-emitter subsequently increases while the fault protection circuit 330 disconnects the transmitting circuit 320 from the terminal E2.

While the ballast 120 of the present invention is preferably a DALI ballast for use with a DALI communication link, the communication circuit of the present invention could be used with control devices coupled to other types of communication links using communication protocols other than the DALI protocol. Further, the fault protection circuit 330 could be used to protect any type of control circuit or communication circuit from high-voltage miswires.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A communication circuit for a load control device, the load control device operable to be coupled to a communication link having two conductors, the load control device operable to transmit a digital message by alternating the communication link between an idle state in which a link voltage is developed across the conductors on the communication link and an active state in which the conductors of the communication link are substantially the same electrical potential, the communication circuit comprising:

a receiving circuit coupled between the conductors of the communication link, the receiving circuit operable to conduct an idle current when the communication link is in the idle state; and a transmitting circuit coupled between the conductors of the communication link, the transmitting circuit comprising:

an optocoupler having an input and an output, the output comprising a phototransistor and operable to become conductive when the input is driven with an input current, the output operable to conduct the idle current immediately after becoming conductive;

a voltage clamp coupled across the output of the optocoupler, the voltage clamp operable to clamp the voltage across the output of the optocoupler in the idle state;

a controllably conductive device responsive to the output of the optocoupler to electrically couple the conductors of the communication link together when the output of the optocoupler is conductive and to stop electrically connecting the conductors of the communication link when the output is non-conductive; and a current source coupled to the phototransistor of the optocoupler, the current source operable to generate a source current when the controllably conductive device is electrically coupling the conductors of the communication link together;

wherein, when the communication link is in the idle state, the current source does not generate the source current; and wherein, when the controllably conductive device is electrically coupling the conductors of the communication link together, the output of the optocoupler is operable to conduct a first portion of the source current and the voltage clamp is operable to conduct a second portion of the source current, such that the phototransistor of the optocoupler is maintained in an active region of operation.

2. The communication circuit of claim 1, wherein the voltage clamp limits the voltage across the output of the optocoupler to approximately two diode drops.

3. The communication circuit of claim 2, wherein the transmitting circuit further comprises an NPN bipolar junction transistor having a base coupled to the emitter of the phototransistor, the series-combination of the collector-emitter junction of the phototransistor and the base-emitter junction of the NPN transistor coupled in parallel electrical connection with the voltage clamp, the NPN transistor operable to become conductive when the phototransistor of the optocoupler is conductive, the controllably conductive device responsive to the NPN transistor to become conductive when the NPN transistor is conductive.

4. The communication circuit of claim 3, wherein the controllably conductive device comprises a first PNP bipolar junction transistor and the transmitting circuit further comprises a diode having a cathode coupled to the collector of the NPN transistor and an anode coupled to a base of the first PNP transistor, such that when the NPN transistor is conductive, a current is conducted through the base of the first PNP transistor.

5. The communication circuit of claim 4, wherein the series combination of the output of the optocoupler and the current source are coupled in series electrical connection between the conductors of the communication link.

6. The communication circuit of claim 5, wherein the current source comprises a second PNP bipolar transistor having a collector coupled to the collector of the phototransistor of the optocoupler, a first resistor coupled to the emitter of the second PNP transistor, and a second resistor coupled in series between the base of the second PNP transistor and the cathode of the diode, the series combination of the first resistor, the emitter-base junction of the second PNP transistor, and the second resistor coupled in parallel electrical connection with the series combination of the emitter-base junction of the first PNP transistor and the diode.

7. The communication circuit of claim 6, wherein the source current is generated by the first resistor and provided to the phototransistor of the optocoupler through the second PNP transistor when the first PNP transistor is conductive.

8. The communication circuit of claim 7, wherein the source current is approximately five milliamps, and the first portion of the source current conducted through the phototransistor of the optocoupler is approximately two milliamps.

9. The communication circuit of claim 3, wherein when the phototransistor is conductive, the voltage across the output of the optocoupler is equal to approximately one diode drop.

10. The communication circuit of claim 9, wherein the voltage across the output of the optocoupler is equal to approximately two diode drops, such that the voltage swing across the output of the optocoupler is equal to approximately one diode drop.

11. The communication circuit of claim 2, wherein the voltage clamp comprises two series-connected diodes.

12. The communication circuit of claim 1, wherein the controllably conductive device comprises a semiconductor switch.

13. The communication circuit of claim 12, wherein the semiconductor switch comprises a bipolar junction transistor.

14. The communication circuit of claim 1, wherein the voltage clamp comprises a zener diode.

15. The communication circuit of claim 1, wherein a rise time of the digital message is approximately 10-15 μsec.

16. A high-voltage fault protection circuit for protecting a communication circuit of a load control device coupled to a digital communication link via first and second terminals, the communication circuit adapted to electrically couple the first and second terminals together, the fault protection circuit operatively coupled to the first and second terminals of the load control device, the fault protection circuit comprising:

a controllably conductive device having two main load terminals and a control input, the main load terminals coupled in series electrical connection between the communication circuit and the second terminal of the load control device, the controllably conductive device rendered conductive when a first voltage having a magnitude less than a predetermined threshold is provided across the first and second terminals, the controllably conductive device operable to become non-conductive and to disconnect the communication circuit and the second terminal when a second voltage having a magnitude greater than the predetermined threshold is provided across the first and second terminals;

a turn-on circuit coupled between the first terminal and the control input of the controllably conductive device, the turn-on circuit operable to provide a drive voltage to the control input of the controllably conductive device when the first voltage is provided across the first and second terminals, the turn-on circuit comprising a resistor, a capacitor, and a zener diode, the capacitor coupled to the control input of the controllably conductive device such that the drive voltage develops across the capacitor, the zener diode coupled in parallel electrical connection with the capacitor to limit the magnitude of the drive voltage; and a current limit circuit for limiting the magnitude of a current conducted through the communication circuit;

wherein if the communication circuit is electrically coupling the conductors of the communication link together and the second voltage is provided across the first and second terminals, the current limit circuit limits the magnitude of the current through the communication circuit and the fault protection circuit subsequently disconnects the communication circuit from the second one of the conductors of the communication link.

17. The fault protection circuit of claim 16, further comprising:

a turn-off circuit coupled between the first terminal and the control input of the controllably conductive device, the turn-off circuit operable to prevent the delivery of the drive voltage to the control input of the controllably conductive device when the second voltage is provided across the first and second terminals.

18. The fault protection circuit of claim 17, wherein the turn-off circuit comprises a transistor coupled to the control input of the controllably conductive device, and a zener diode coupled between the first terminal and a base of the transistor, such that the zener diode is operable to conduct a current into the base of the transistor when the second voltage is provided across the first and second terminals, whereby the transistor becomes conductive to remove the drive voltage from the control input of the controllably conductive device.

19. The fault protection circuit of claim 16, wherein the controllably conductive device comprises a semiconductor switch.

20. The fault protection circuit of claim 19, wherein the semiconductor switch comprises a high-voltage field-effect transistor.

21. A communication circuit for a load control device, the load control device operable to be coupled to a communication link having two conductors, the load control device operable to transmit a digital message by changing the communication link between an idle state in which a first voltage is developed across the conductors on the communication link and an active state in which the conductors of the communication link are at substantially the same electrical potential, the communication circuit comprising:

a receiving circuit coupled between the conductors of the communication link, the receiving circuit operable to conduct an idle current;

a transmitting circuit coupled between the conductors of the communication link, the transmitting circuit comprising a controllably conductive device for electrically coupling the conductors of the communication link together, and a current limit circuit for limiting the magnitude of a current through the controllably conductive device; and a fault protection circuit operatively coupled between the conductors of the communication link and operable to protect the receiving and transmitting circuits, the fault protection circuit comprising a controllably conductive device coupled between the receiving and transmitting circuits and a second one of conductors of the communication link, the fault protection circuit further comprising a turn-on circuit coupled between the first terminal and the control input of the controllably conductive device, the turn-on circuit including a resistor, a capacitor coupled to the control input of the controllably conductive device for developing a drive voltage, and a zener diode coupled in parallel electrical connection with the capacitor to limit the magnitude of the drive voltage, the turn-on circuit operable to provide the drive voltage to the control input of the controllably conductive device, such that the controllably conductive device is rendered conductive when the first voltage is provided across the conductors of the communication link, the controllably conductive device rendered non-conductive when a second voltage is provided across the first and second terminals, the first voltage having a magnitude less than a predetermined threshold, the second voltage having a magnitude greater than the predetermined threshold;

wherein if the controllably conductive device of the transmitting circuit is electrically coupling the conductors of the communication link together and the second voltage is provided across the first and second terminals, the current limit circuit limits the magnitude of the current through the controllably conductive device of the transmitting circuit and the fault protection circuit subsequently disconnects the transmitting circuit from the second one of the conductors of the communication link.

22. The communication circuit of claim 21, wherein the transmitting circuit further comprises an optocoupler having a phototransistor for providing an output, such that the controllably conductive device electrically couples the conductors of the communication link together when the output of the optocoupler is conductive, the communication circuit further comprising a voltage clamp operable to clamp the voltage across the output of the optocoupler in the idle state and a current source operable to provide the phototransistor of the optocoupler with excess current such that the phototransistor is maintained in the active region when the phototransistor is conductive.

23. The communication circuit of claim 21, wherein if the controllably conductive device is conductive and the second voltage is provided across the first and second terminals, the current limit circuit limits the magnitude of the current through the controllably conductive device, the voltage across the controllably conductive device increases, and the fault protection circuit subsequently disconnects the transmitting circuit from the second one of the conductors of the communication link.

24. A method of transmitting a digital message from a communication circuit via a communication link having two conductors, the method comprising the steps of:
drawing an idle current when the communication link is in an idle state;
providing an optocoupler having an input and an output comprising a phototransistor;
limiting the voltage produced across the output of the optocoupler;
driving the input of the optocoupler, such that the output of the optocoupler is operable to conduct a drive current;
electrically connecting the two conductors of the communication link to change the communication link from an idle state to a shorted state in response to the step of driving the input of the optocoupler;
providing a source current to the phototransistor to maintain the phototransistor in the active region of operation only when the phototransistor is conducting the drive current;
ceasing driving the input of the optocoupler, such that the output of the optocoupler ceases to conduct the drive current; and
ceasing providing the source current to the phototransistor after the step of ceasing driving the input of the optocoupler.

25. The method of claim 24, wherein the drive current has an initial magnitude substantially the same as the magnitude of the idle current.

26. The method of claim 24, wherein the magnitude of the source current is greater than the magnitude of the drive current, the method further comprising the step of:
providing a current path for the excess current equal to the difference between the source current and the drive current.

27. A method of protecting a communication circuit of a load control device operable to be coupled to a digital communication link via first and second terminals, the method comprising the steps of:
providing a controllably conductive device operatively coupled between the communication circuit and the second terminal, the controllably conductive device having a control input operatively coupled to the first terminal through a turn-on circuit, the turn-on circuit including a resistor, a capacitor coupled to the control input of the controllably conductive device for developing a drive voltage, and a zener diode coupled in parallel electrical connection with the capacitor;
the turn-on circuit providing the drive voltage to the control input of the controllably conductive device when a first voltage is provided across the first and second terminals;
the zener diode limiting the magnitude of the drive voltage;
limiting a current conducted through the communication circuit;
subsequently determining if a voltage developed between the first and second terminals exceeds a predetermined threshold; and
causing the controllably conductive device to become nonconductive to disconnect the communication circuit from the second terminal in response to determining that the voltage developed between the first and second terminals exceeds the predetermined threshold.

* * * * *